United States Patent [19]

Baer

[11] 4,100,115

[45] Jul. 11, 1978

[54] HIGH-TEMPERATURE INSULATION COMPOSITE MOLDED PRODUCT

[75] Inventor: Steven R. Baer, Lancaster, Pa.

[73] Assignee: Armstrong Cork Company, Lancaster, Pa.

[21] Appl. No.: 712,310

[22] Filed: Aug. 6, 1976

[51] Int. Cl.$^2$ ................................................ C08J 9/00
[52] U.S. Cl. ........................................ 521/83; 106/75; 521/100; 521/141; 521/181; 521/91; 521/122; 521/138
[58] Field of Search .............. 260/2.5 R, 2.5 F, 2.5 N, 260/2.5 L; 106/75

[56] References Cited

U.S. PATENT DOCUMENTS

| | | | |
|---|---|---|---|
| 2,915,301 | 12/1959 | Selden | 106/88 |
| 3,010,835 | 11/1961 | Charles et al. | 106/86 |
| 3,445,253 | 5/1969 | Lee | 106/286 |
| 3,522,067 | 7/1970 | MacArthur | 106/84 |
| 3,600,203 | 8/1971 | Aldera | 106/38.3 |
| 3,656,647 | 8/1972 | Swinn | 215/9 |
| 3,661,603 | 5/1972 | Nicol | 106/86 |
| 3,679,445 | 7/1972 | Howe | 106/90 |
| 3,692,728 | 9/1972 | Bonnel | 106/104 |
| 3,758,319 | 9/1973 | Ergene | 106/88 |
| 3,775,351 | 11/1973 | Sachs | 260/2.5 L |
| 3,787,368 | 1/1974 | Lander | 260/2.5 D |

OTHER PUBLICATIONS

Chem Abstracts (Janowiecki et al.), vol. 75, 100896p, 1971, p. 160.

*Primary Examiner*—M. J. Welsh
*Attorney, Agent, or Firm*—Sughrue, Rothwell, Mion, Zinn and Macpeak

[57] ABSTRACT

A cellular high-temperature insulation composite molded product comprising the molded and cured product obtained by preparing a mixture of
(1) a dry blend of
  (a) expanded perlite,
  (b) a calcium aluminate cement,
  (c) a refractory clay, and
  (d) wollastonite, with
(2) an aqueous liquid composition comprising
  (a) an auxiliary binder, and
  (b) water and molding and curing the mixture, and a method for the production of the above-described cellular high-temperature insulation composite molded product. Additional embodiments comprise use of reinforcing fibers and a surface active agent additionally in the aqueous liquid composition, generally as a foamed aqueous liquid composition and use of a chemical cement curing accelerator additionally in the aqueous liquid composition.

48 Claims, No Drawings

HIGH-TEMPERATURE INSULATION COMPOSITE MOLDED PRODUCT

BACKGROUND OF THE INVENTION

1. Field of the Invention

This invention relates to a composite molded product which is cellular in nature and has high-temperature insulation characteristics. More specifically, this invention relates to a cellular high-temperature insulation composite molded product comprising a molded and cured mixture of predominantly inorganic materials. This invention also relates to a method for producing the cellular high-temperature insulation composite molded product described above.

2. Description of the Prior Art

Composite molded products comprising various inorganic and organic components are well-known in the art and are often used commercially as building materials, construction materials and the like.

Representative examples of patents disclosing composite molded products include the following:

U.S. Pat. No. 3,661,603 describes a light-weight, rigid composition prepared by mixing water, a cementitious material such as a calcium aluminate cement, asbestos fibers and an anionic surface active agent or including a different surface active agent where a cellular material is formed.

U.S. Pat. No. 3,679,445 discloses a low density air-entrained concrete prepared from a high alumina cement, an aggregate, a wetting agent, water, and short strands of reinforcing fibers.

U.S. Pat. No. 3,758,319 discloses the formation of a foamed concrete structure by generating a foam by mixing water, a foaming agent and an accelerator and adding this foamed mixture to a cement-water mixture which can contain conventional aggregates and fibrous materials as well as a (meth)acrylic acid polymer as a binder.

U.S. Pat. No. 3,600,203 discloses a process for the production of a composite material by mixing sand, water, an accelerating agent and a surface active agent followed by addition of this mixture to an aluminous cement.

U.S. Pat. No. 3,010,835 discloses high-temperature light-weight refractory castables formed by compounding a light-weight coarse aggregate and a calcium aluminate hydraulic setting cement, which can include a low melting refractory material such as expanded perlite, finely ground raw kyanite and finely ground calcined flint fire clay.

U.S. Pat. No. 3,692,728 discloses cements formed from a hydraulic binder of a high alumina cement, an acrylamide-formaldehyde polymer and a polymerization catalyst.

U.S. Pat. No. 3,565,647 discloses the preparation of composite foamed materials including aluminum phosphate bonded wollastonite.

U.S. Pat. No. 3,775,351 discloses production of a concrete or gypsum type material of a cellular nature, involving whipping air into an aqeuous resinous emulsion which can contain an accelerator, then adding a dry inorganic phase which can contain fiberglass followed by molding the mixture.

U.S. Pat. No. 2,915,301 discloses a generator for the continuous generation of foamed slurries, and further a process of forming a foamed slurry by mixing dry cementitious material and water and ejecting the mixture through an orifice whereby it is mixed with a preformed foam.

The above examples of representative composite molded materials known in the art provide various properties but are deficient in desirable properties such as thermal insulation properties and particularly at high temperatures, i.e., around 1,500° F (815° C), in that a significant degradation of the physical and chemical properties of these prior art composite materials is observed.

SUMMARY OF THE INVENTION

An object of this invention is to provide a composite molded product having high-temperature insulation properties.

Another object of this invention is to provide a high-temperature insulation composite molded product which is cellular in nature and thus is light-weight.

A further object of this invention is to provide a cellular high-temperature insulation composite molded product which can withstand high temperatures without any significant degradation of its physical and thermal properties.

A further object of this invention is to provide a method for preparing a cellular high-temperature insulation composite molded product.

In one embodiment of this invention, the objects of this invention are accomplished by a cellular high-temperature insulation composite molded product which comprises the molded and cured product obtained by preparing a mixture of (1) a dry blend of
  (a) expanded perlite,
  (b) a calcium aluminate cement,
  (c) a refractory clay, and
  (d) wollastonite, with
(2) an aqueous liquid composition comprising
  (a) an auxiliary binder, and
  (b) water and molding and curing the mixture.

In another, preferred embodiment of the invention, the above objects of this invention are accomplished by a cellular high-temperature insulation composite molded product which comprises the molded and cured product obtained by preparing a mixture of (1) a dry blend of
  (a) expanded perlite
  (b) a calcium aluminate cement
  (c) a refractory clay, and
  (d) wollastonite, with
(2) a foamed aqueous liquid composition comprising
  (a) an auxiliary binder
  (b) water
  (c) reinforcing fibers, and
  (d) a surface active agent and molding and curing the mixture.

In a further embodiment of this invention, this invention provides a cellular high-temperature insulation composite molded product which comprises the molded and cured product obtained by preparing a mixture of (1) a dry blend of
  (a) expanded perlite
  (b) a calcium aluminate cement,
  (c) a refractory clay, and
  (d) wollastonite, with
(2) an aqueous liquid composition comprising
  (a) an auxiliary binder (b) water, and
(c) a chemical cement curing accelerator
or a mixture of
(1) a dry blend of
(a) expanded perlite
(b) a calcium aluminate cement,
(c) a refractory clay, and
(d) wollastonite, with
(2) a foamed aqueous liquid composition comprising
(a) an auxiliary binder
(b) water
(c) reinforcing fibers
(d) a surface active agent
(e) a chemical cement curing accelerator and molding and curing the mixture.

In an even further embodiment of this invention, the above-objects of this invention are accomplished by a method for producing the cellular high-temperature insulation composite molded product described above, the method comprising preparing a mixture of the components as described above and molding, e.g., by extruding, the mixture prepared as described above to form a "green" composite molding and curing the "green" composite molding to produce the cellular high-temperature insulation composite molded product.

DETAILED DESCRIPTION OF THE INVENTION

The cellular high-temperature insulation composite molded product of this invention includes the above-described components which are described below.

The expanded perlite which is used as component (a) of the dry blend (1) comprises particles of expanded perlite. Perlite is a naturally occurring volcanic glass consisting essentially of aluminium silicate and generally containing about 2 to 5% by weight bound water. When, heated rapidly to its softening point, the water is driven off causing the perlite to expand 10 to 20 times its size into a cellular structure, light-weight aggregate with good thermal insulating properties. Expanded perlite and its production is described in U.S. Pat. Nos. 3,445,253 and 3,522,067. A suitable particle size for the perlite particles which can be used in this invention are those having the following particle size distribution

| U.S. Standard | Cumulative % (by weight) | |
| --- | --- | --- |
| Sieve | Minimum | Maximum |
| + 50 | 0 | 10 |
| + 100 | 59 | 74 |
| + 200 | 90 | 100 |

A second component of the dry blend used to produce the composite molded product of this invention comprises component (b), a calcium aluminate cement. Suitable calcium aluminates which can be employed are commercially available and include Fondu produced by Lone Star Lafarge, CA-25 produced by Aluminum Co. of America, Luminate produced by U.S. Steel, etc.

A suitable calcium aluminate cement generally has the following properties

| | Broad | Preferred |
| --- | --- | --- |
| Loose Bulk Density (lb/ft$^3$) | about 80–100 | 85–95 |
| Specific Gravity (g/cm$^3$) | about 3.0–3.5 | 3.2–3.25 |
| Chemical Analysis (approximate % by weight) | | |
| Al$_2$O$_3$ | 40 | |
| TiO$_2$ | 2 | |
| CaO | 38 | |
| Fe$_2$O$_3$ | 11 | |
| FeO | 4 | |
| SiO$_2$ | 5 | |
| Particle Size | 80% less than 325 mesh | |
| Surface Area (cc/g) | >1500 | |

A third component of the dry blend used to produce the composite molded product of this invention, component (c), is a refractory clay. Suitable examples of refractory clays include bentonite, M & D clay produced by Tennessee Clay Co., montmorillonite, kaolinite, etc.

A fourth component, component (d), employed in the dry blend used in the composite molded product of this invention is wollastonite. Wollastonite is a calcium meta-silicate material of a fibrous nature and is generally employed in the form of a coarse grind.

The above-described essential components of the dry blend used in the composite molded product of this invention are generally employed in the weight proportions set forth in Table 1 below:

TABLE 1

| Component | Broad Range (parts by wt.) | Preferred Range (parts by wt.) |
| --- | --- | --- |
| Expanded perlite | about 70 – 130 | 90 – 110 |
| Calcium aluminate cement | about 35 – 70 | 40 – 60 |
| Refractory clay | about 5 – 25 | 8 – 15 |
| Wollastonite | about 5 – 40 | 8 – 20 |

A dry uniform blended mixture of the expanded perlite particles, calcium aluminate cement, refractory clay and wollastonite is prepared and such can be mixed using conventional techniques in the art, such as using a cement mixer, a ribbon mixer, a V-shell mixer, etc. A suitable mixing time can range from about 5 to 10 minutes and can be at room temperature, although neither of these is critical in any way.

Once the uniform blend is produced of these dry materials, this blend is then mixed with an aqueous liquid composition.

The aqueous liquid composition which is mixed with the dry blend as described above comprises components including (a) water, (b) an auxiliary binder and preferably (c) a surface active agent, (d) reinforcing fibers, and (e) a chemical accelerator.

A first component, component (a), of the aqueous liquid composition comprises an auxiliary binder which can be an inorganic binder or an organic binder. Synthetic resins can be used as the organic binder and such can be a thermoplastic or thermosetting synthetic resin. Examples of suitable synthetic resins include resins such as urea-formaldehyde resins (such as Rhonite R-2 produced by Rohm & Haas etc.), metal-modified urea-formaldehyde resins (such as those disclosed in U.S. Pat. No. 3,787,368), acrylic resins (in the form of dispersions and an emulsion) such as the Rhoplexes (AC-20, AC-22, AC-33, AC-201*, AC-604*, AC-660, B-85, B-92, E-330, MC-76, etc.), Acrysol WS-12, Expers E-898 and Acryloic MC-46, all produced by Rohm & Haas), vinylethylene resins (such as Airflex 400, produced by Air-Products and Chemicals), poly(vinyl acetate) resins (such as Polyco 2113, Polyco 2140, Polyco 2607, produced by Borden Chemical), phenol-formaldehyde resins (such as Plyophen 22-398* produced by Reichold Chemicals), vinyl chloride resins (such as Geon 460X6 and Geon 460X21 produced by B. F. Goodrich Chemical Co., and Hycar 2600X138, Hycar 2600X171, and Carboset 531* all produced by B. F. Goodrich Chemical Co.), poly(vinyl alcohol) resins (such as Elvanol 90–50G* produced by E. I. du Pont de Nemours, Vinol 205K and Vinol 107K*, both produced by Air Products & Chemicals), ethylene - vinyl chloride copolymer resins (such as Polyvin 2500 produced by Monsanto), melamine-formaldehyde resins (such as Resimene X735 produced by Monsanto and Zymel 481 produced by American Cyanamid), styrene-butadiene-rubber latexes and nitrile-butadiene-rubber latexes, etc. Suitable inorganic binders include materials such as "O" Sodium Silicate produced by Philadelphia Quartz. Those binders which are starred above with an asterisk are preferred. The term auxiliary binder is used herein to describe the above materials since the calcium aluminate cement used in the dry blend also acts as a binder in the molded product.

A third component, component (c), of the aqueous liquid composition is a surface active agent. Suitable examples of surface active agents which can be employed as this component include non-ionic surface active agents such as a polyethylene glycol ether such as Tergitol TMN produced by Union Carbide and Triton produced by Rohm & Haas, and anionic surface active agents such as an alkylaryl sulfonate such as Bio Soft D-40 produced by Stepan Calsoft produced by Pilot and Sul-fon-ate produced by Cities Service.

The reinforcing fiber component as a component of the aqueous liquid composition, component (d), is employed in order to provide additional structural strength. Reinforcing fibers which can be employed include a large number of different organic and inorganic synthetic and natural fibers such as polyester, polyamide (e.g., nylon), cellulosic (e.g., rayon), cotton and glass fibers. A suitable size thereof can range from ¼ to ½ inch in length and a suitable denier can be 1 to 3 DFF.

The chemical cement curing accelerator component, component (e), of the aqueous liquid composition is employed to accelerate the cure of the cementitious material (induce cement hydration). Suitable examples of accelerators include lithium carbonate, cured cement, Portland cement, calcium silicate, sodium silicate, etc.

In the above described aqueous liquid composition, water as component (b) is used as an aqueous medium. Where only the auxiliary binder, component (a), and water, component (b) are employed, the aqueous liquid composition is simply mixed with the dry blend of the recited components. Where a reinforcing fiber component (c) is employed to increase the structural strength of the product, a surface active agent, component (d), is employed and the aqueous liquid composition foamed in order to disperse the reinforcing fibers throughout the aqueous liquid composition. The formation of the foamed aqueous liquid composition can be accomplished as follows. The liquid components of the composition are combined with the surface active agent. The mixture is agitated under turbulent conditions to cause air entrainment thus producing a foam. When the air level reaches approximately 50% by volume, the foam has expanded two fold, and the fibrous material is then added. Agitation is continued until all fibers of the fibrous material are separated and dispersed throughout the foam.

In preparing the aqueous liquid composition or the foamed aqueous liquid composition described above, the components described above and water are mixed in the weight proportions set forth in Table 2 below:

TABLE 2

| Component | Broad Range (parts by wt.) | Preferred Range (parts by wt.) |
| --- | --- | --- |
| Water | about 80 – 200 | 90 – 110 |
| Auxiliary binder | about 10 – 20 | 12 – 15 |
| Surface active agent | about 0 – 1 | 0.1 – 0.2 |
| Reinforcing fiber | about 0 – 6 | 1 – 2 |
| Cement accelerator | about 0 – 1 | 0.1 – 0.2 |

The aqueous liquid composition described above can be produced at about room temperature (e.g., about 20° to 30° C). Foaming is generally accomplished in about 10 minutes and dispersion of the fibrous material in about 5 minutes.

Hereinafter the term liquid composition is used to describe both the aqueous liquid composition and the foamed aqueous liquid composition.

Once the dry blend and the foamed liquid composition have been mixed, the mixture has the consistency of "damp sand". A suitable proportion by weight of the dry blend to the aqueous liquid composition can range from about 1:3 to 1:0.5, preferably 1:1.5 to 1:0.6. This mixture is then molded into a desired shape and then allowed to cure or heated to accelerate the cure to obtain the high-temperature insulation composition molded product of the invention. Air drying for curing produces a good product, but requires longer production times and thus is less preferred. The amount of the free water (not including water of hydration) in the composite molded product can range up to about 5% by weight but preferably is 0 to 2% by weight.

As described above, this invention also provides a method for producing the cellular high-temperature insulation composite molded product described above. This method comprises mixing the dry mixture of the expanded perlite particles, the calcium aluminate cement, the refractory clay and the wollastonite in the proportions desired until a homogeneous mixture is obtained. While the mixing time will in general be dependent upon the volume of the material to be mixed and the nature of the equipment used, where a standard rotary cement mixer approximately two-thirds full is employed, a mixing time of approximately ten minutes has been found to be acceptable. Three minutes has been found suitable using a ribbon or paddle mixer. The mixing time and manner of mixing are not critical as long as a uniform blend is obtained.

Separately, the liquid composition is prepared by mixing the water, and the remaining components to be used and where the liquid composition is foamed, forming a foam. The foam formation can be by using an Oakes mixer, if desired.

The liquid composition produced in accordance with the above described prodedure is then added to the previously prepared dry blended mixture of the inorganic components described above and the mixture of these two compositions simply blended as described above, e.g., for approximately ten minutes in a cement mixer. The resulting composition has the consistency of damp sand and can be subsequently formed into the desired composite molded product shape.

A suitable method of forming a molding in the desired shape is to use a ram extrusion machine. Other techniques include using a pipe machine, a Packer-head stamping press, a "three-jaw" press, a mold press, etc.

Where a ram extrusion machine is employed, a reciprocating ram of the desired cross section is used. The reciprocation ram pushes the composite mixture through a set of mating dies having the desired cross section. Suitable molding cross sections which can be produced in accordance with this technique include circular, half circular, rectangular, etc., cross-sectional configurations.

Suitable molding pressures range from about 1.5 to 10 kg/cm² and molding can be at room temperature (about 20°-30° C).

After the forming or the molding of the composite mixture is completed, the composite molded product is then simply allowed to cure or heated to cure. The curing occurs as a result of the cement binder hydrating in the presence of water and it is desirable that the surface of the moldings not be allowed to dry until curing is completed. With the use of the chemical accelerator for the cement described above, a suitable curing time can range from about 3 to 8 hours, more generally about 4 to 6 hours, at 0° to 90° C more generally 35° to 50° C. Where the chemical accelerator is not employed, longer curing times are employed. In addition, while the composite molding product can be allowed to cure per se, if desired, the curing can be accelerated by elevating the temperature to, for example, about 20° to 80° C, preferably 40° to 60° C. While an elevated temperature increases the rate of cure, the ultimate product strength may be somewhat weakened as a result.

In addition, the chemical cement curing accelerator present in the composition causes the pH to increase and thereby initiate hydration. The hydration reaction is exothermic and results in an elevation of the temperature thereby initiating a cure of the thermosetting synthetic resin present.

After a substantial cure of the composite molded product has occurred, excess water can be removed by drying the composite molded product, for example, in an oven at about 45° to 120° C, preferably 95° to 105° C. Alternatively the composite molded product can be simply allowed to dry in the open at room temperature. In addition, the drying step not only results in a removal of water and any other volatile materials which are present but also insures that the synthetic resin is completely cured.

After the above steps have been completed, the high-temperature insulation composite molded product of this invention can then be subjected to additional treatments such as surface treatments, impregnation, coating, etc. and may include trimming to square edges, fabricating fittings, including lamination of or application of surface layers, coatings or finishes to the product, etc.

Some of the advantages of the high-temperature insulation composite molded product of this invention are set forth below. For example, the high-temperature insulation composite molded product of this invention can be produced using a low amount of energy, which is desirable from the standpoint of conservation of natural resources, can be produced by a continuous extrusion process in a desired cross section, has properties of improved thermal conductivity due to the infra-red inhibition of the alumina binder and in addition has reduced friability and dusting on fabrication subsequently. It is believed that these properties of the high-temperature insulation composite molded product of this invention arise as a result of the binding of the expanded perlite particles primarily by the calcium aluminate cement. The synthetic resin results in an increase in the mechanical strength and results also in a reduction in dusting, which is advantageous in shipping, handling and subsequent fabrication. When the high-temperature insulation composite molded product of this invention is employed in high temperature applications, the organic synthetic resins, naturally, will be decomposed, but the binding properties and the strengthening characteristics such gives rise to in the high-temperature insulation composite molded product of this invention are compensated for by the refractory clay present as it hardens and is fired due to subjection to the high temperature.

The following examples are given to illustrate the invention in greater detail without limiting the same. Unless otherwise indicated herein, all parts, percents, ratios, and the like are by weight and all processing procedures were conducted at room temperature (about 20°-30° C) and at atmospheric pressure.

EXAMPLE 1

The following components in the amounts set forth below were used.

| Dry Blend | parts by weight |
| --- | --- |
| Perlite | 100 |
| Fondu | 50 |
| M + D Clay | 10 |
| Wollastonite | 10 |
| Foam Composition | |
| Poly Vinyl Alcohol | 6 |
| Acrylic Resin | 3 |
| Polyester Fiber | 1 |
| Surface Active Agent | * |
| Water | 100 |
| TOTAL | 280 |

*0.2% by weight based on liquid component weight

The components of the dry blend designated above were premixed in a tumble or ribbon type mixer to achieve a homogeneous blend.

The components in the foam composition other than the polyester fiber were foamed by a mechanical air entrainment process to an approximately 50% by volume air content; the polyester fiber was then added to the foam and agitation continued until all the fiber was fully dispersed.

The dry blend and the foam composition were then blended together for 5 to 10 minutes in a ribbon mixer until a uniform wetting and fiber dispersion was obtained.

The consistency of the mixture obtained was that of damp sand and such was charged into a mold, consolidated under a moderate pressure (about 35 psi), with a volume reduction of about 2 to 2.5 times. The green composite molded product was removed from the mold and allowed to cure.

The physical properties of the high temperature insulation composite molded product prepared as described above were then evaluated as set forth below and with the results shown below being obtained.

| | |
| --- | --- |
| Density | 12.9 pcf |
| Compressive Strength (ASTM C-165) | 50 psi |
| Modulus Of Rupture (ASTM C-203) | 60 psi |
| Thermal Conductivity (ASTM C-177) | 300° F - 0.42 BTU/hr ft² (F/in) |
| | 500° F - 0.57 |

-continued

| | |
|---|---|
| 700° F | 0.65 |

EXAMPLE II

The procedures of Example I were repeated using the following components in the amounts indicated.

| Dry Blend | parts by weight |
|---|---|
| Perlite | 100 |
| Fondu | 50 |
| M + D Clay | 10 |
| Wollastonite | 10 |
| Foam Composition | |
| Acrylic Resin | 9 |
| Polyester Fiber | 1 |
| Surface Active Agent | as in Example I |
| Water | 100 |
| TOTAL | 280 |

The properties of the composite molded product of this invention obtained were as follows

| | |
|---|---|
| Density | 12.6pcf |
| Compressive Strength | 80 psi |
| Modulus Of Rupture | 30 psi |
| Thermal Conductivity | 300° F - 0.42 BTU/hr ft² (F/in) |
| | 500° F - 0.56 |
| | 700° F - 0.67 |

EXAMPLE III

The procedures of Example I were repeated using the following components in the amounts indicated.

| Dry Blend | parts by weight |
|---|---|
| Perlite | 100 |
| Fondu | 50 |
| M + D Clay | 10 |
| Wollastonite | 10 |
| Foam Composition | |
| Polyester Fiber | 1 |
| Surface Active Agent | as in Example I |
| Water | 100 |
| TOTAL | 271 |

The properties of the composite molded product of the invention obtained were as follows.

| | |
|---|---|
| Density | 12.8pcf |
| Compressive Strength | 50 psi |
| Modulus Of Rupture | 25 psi |
| Thermal Conductivity | 300° F - 0.41 BTU/hr ft² (F/in) |
| | 500° F - 0.54 |
| | 700° F - 0.66 |

EXAMPLE IV

The procedures of Example I were repeated using the following components in the amounts indicated

| Dry Blend | parts by weight |
|---|---|
| Perlite | 100 |
| Fondu | 50 |
| M + D Clay | 10 |
| Wollastonite | 10 |
| Foam Composition | |
| Poly Vinyl Alcohol | 9 |
| Polyester Fiber | 1 |
| Surface Active Agent | as in Example I |
| Water | 100 |
| TOTAL | 280 |

The properties of the composite molded product of the invention obtained were as follows

| | |
|---|---|
| Density | 12.7pcf |
| Compressive Strength | 30 psi |
| Modulus Of Rupture | 90 psi |
| Thermal Conductivity | 300° F - 0.41 BTU/hr ft² (F/in) |
| | 500° F - 0.53 |
| | 700° F - 0.66 |

EXAMPLE V

The procedures of Example I were repeated using the following components in the amounts indicated

| Dry Blend | parts by weight |
|---|---|
| Perlite | 100 |
| Fondu | 75 |
| M + D Clay | 10 |
| Wollastonite | 10 |
| Foam Composition | |
| Acrylic Resin | 3 |
| Poly Vinyl Alcohol | 6 |
| Polyester Fiber | 1 |
| Surface Active Agent | as in Example I |
| Water | 100 |
| TOTAL | 315 |

The properties of the composite molded product of the invention obtained were as follows

| | |
|---|---|
| Density | 12.9pcf |
| Compressive Strength | 45 psi |
| Modulus Of Rupture | 50 psi |
| Thermal Conductivity | 300° F - 0.43 BTU/hr ft² (F/in) |
| | 500° F - 0.59 |
| | 700° F - 0.69 |

EXAMPLE VI

The procedures of Example I were repeated using the following components in the amounts indicated

| Dry Blend | parts by weight |
|---|---|
| Perlite | 100 |
| Fondu | 35 |
| M + D Clay | 15 |
| Wollastonite | 20 |
| Foam Composition | |
| Acrylic Resin | 3 |
| Poly Vinyl Alcohol | 6 |
| Polyester Fiber | 1 |
| Surface Active Agent | as in Example I |
| Water | 100 |
| TOTAL | 280 |

The properties of the composite molded product of the invention obtained were as follows

| | |
|---|---|
| Density | 12.8 pcf |
| Compressive Strength | 50 psi |
| Modulus Of Rupture | 50 psi |
| Thermal Conductivity | 300° F - 0.48 BTU/hr ft (F/in) |
| | 500° F - 0.59 |
| | 700° F - 0.70 |

The high temperature insulation composite molded product of this invention produced in accordance with the above, and as specifically exemplified by the above non-limiting examples in general has a density ranging from about 10 to 15 lb/ft$^3$, a compressive strength of about 45 to 100 psi (ASTM C-165) and a modulus of rupture of about 30 to 90 psi (ASTM C-203).

While the invention has been described in detail and with respect to specific embodiments thereof, it will be apparent to one skilled in the art that various changes and modifications can be made therein without departing from the spirit and scope thereof.

What is claimed is:

1. A cellular high-temperature insulation composite molded product comprising the molded and cured product obtained by preparing a mixture of
    (1) a dry blend of
        (a) expanded perlite,
        (b) a calcium aluminate cement,
        (c) a refractory clay, and
        (d) wollastonite, with
    (2) an aqueous liquid composition comprising
        (a) an auxiliary binder, and
        (b) water and molding and curing the mixture or allowing the mixture to cure.

2. The cellular high-temperature insulation composite molded product of claim 1, wherein said expanded perlite has a particle size in accordance with the following

| U.S. Standard | Cumulative % (by weight) | |
| Sieve | Minimum | Maximum |
| --- | --- | --- |
| + 50 | 0 | 10 |
| + 100 | 59 | 74 |
| + 200 | 90 | 100 |

3. The cellular high-temperature insulation composite molded product of claim 1, wherein said refractory clay is M & D clay, bentonite, kaolinite or montmorillonite.

4. The cellular high-temperature insulation composite molded product of claim 1, wherein said auxiliary binder is a synthetic resin.

5. The cellular high-temperature insulation composite molded product of claim 4, wherein said synthetic resin is a thermoplastic synthetic resin or a thermosetting synthetic resin.

6. The cellular high-temperature insulation composite molded product of claim 4, wherein said synthetic resin is an acrylic resin, a phenol-formaldehyde resin or a polyvinyl alcohol resin.

7. The cellular high-temperature insulation composite molded product of claim 1, wherein the respective proportions by weight of the expanded perlite, the calcium aluminate cement, the refractory clay and the wollastonite in said dry blend range from about 70 : 35 : 5 : 5 to about 130 : 70 : 25 : 40.

8. The cellular high-temperature insulation composite molded product of claim 1, wherein the respective proportions by weight of the water and the auxiliary binder in said aqueous liquid composition range from about 80 : 10 to 200 : 20.

9. The cellular high-temperature insulation composite molded product of claim 1, wherein the respective proportions by weight of said dry blend to said aqueous liquid composition range from about 1 : 3 to 1 : 0.5.

10. The cellular high-temperature insulation composite molded product of claim 1, wherein the composite molded product has a density of about 10 to 15 lb/ft$^3$, a compressive strength according to ASTM C-165 of about 45 to 100 psi and a modulus of rupture according to ASTM C-203 of about 30 to 90 psi.

11. A cellular high-temperature insulation composite molded product comprising the molded and cured product obtained by preparing a mixture of
    (1) a dry blend of
        (a) expanded perlite,
        (b) a calcium aluminate cement,
        (c) a refractory clay, and
        (d) wollastonite, with
    (2) a foamed aqueous liquid composition comprising
        (a) an auxiliary binder,
        (b) water,
        (c) reinforcing fibers, and
        (d) a surface active agent and molding and curing the mixture or allowing the mixture to cure.

12. The cellular high-temperature insulation composite molded product of claim 11, wherein said expanded perlite has a particle size in accordance with the following

| U.S. Standard | Cumulative % (by weight) | |
| Sieve | Minimum | Maximum |
| --- | --- | --- |
| + 50 | 0 | 10 |
| + 100 | 59 | 74 |
| + 200 | 90 | 100 |

13. The cellular high-temperature insulation composite molded product of claim 11, wherein said refractory clay is M & D clay, bentonite, kaolinite or montmorillonite.

14. The cellular high-temperature insulation composite molded product of claim 11, wherein said auxiliary binder is a synthetic resin.

15. The cellular high-temperature insulation composite molded product of claim 14, wherein said synthetic resin is a thermoplastic synthetic resin or a thermosetting synthetic resin.

16. The cellular high-temperature insulation composite molded product of claim 14, wherein said synthetic resin is an acrylic resin, a phenol-formaldehyde resin or a polyvinyl alcohol resin.

17. The cellular high-temperature insulation composite molded product of claim 11, wherein said reinforcing fibers are natural fibers, synthetic fibers or mixtures thereof.

18. The cellular high-temperature insulation composite molded product of claim 11, wherein said surface active agent is a nonionic surface active agent or an anionic surface active agent.

19. The cellular high-temperature insulation composite molded product of claim 11, wherein the respective proportions by weight of the expanded perlite, the calcium aluminate cement, the refractory clay and the wollastonite in said dry blend range from about 70 : 35 : 5 : 5 to about 130 : 70 : 25 : 40.

20. The cellular high-temperature insulation composite molded product of claim 11, wherein the respective proportions by weight of the water, the auxiliary binder, the surface active agent and the reinforcing fibers in the aqueous liquid composition range from about 80 : 10 : 0.1 : 1 to about 200 : 20 : 1 : 6.

21. The cellular high-temperature insulation composite molded product of claim 11, wherein the respective proportions by weight of said dry blend to said aqueous liquid composition range from about 1 : 3 to 1 : 0.5.

22. The cellular high-temperature insulation composite molded product of claim 11, wherein the composite molded product has a density of about 10 to 15 lb/ft$^3$, a compressive strength according to ASTM C-165 of about 45 to 100 psi and a modulus of rupture according to ASTM C-203 of about 30 to 90 psi.

23. The cellular high-temperature insulation composite molded product of claim 1, wherein said aqueous liquid composition further includes a chemical cement curing accelerator.

24. The cellular high-temperature insulation composite molded product of claim 23, wherein said expanded perlite has a particle size in accordance with the following

| U.S. Standard Sieve | Cumulative % (by weight) | |
|---|---|---|
| | Minimum | Maximum |
| + 50 | 0 | 10 |
| + 100 | 59 | 74 |
| + 200 | 90 | 100 |

25. The cellular high-temperature insulation composite molded product of claim 23, wherein said refractory clay is M & D clay, bentonite, kaolinite or montmorillonite.

26. The cellular high-temperature insulation composite molded product of claim 23, wherein said auxiliary binder is a synthetic resin.

27. The cellular high-temperature insulation composite molded product of claim 26, wherein said synthetic resin is a thermoplastic synthetic resin or a thermosetting synthetic resin.

28. The cellular high-temperature insulation composite molded product of claim 26, wherein said synthetic resin is an acrylic resin, a phenol-formaldehyde resin or a polyvinyl alcohol resin.

29. The cellular high-temperature insulation composite molded product of claim 23, wherein said chemical cement curing accelerator is lithium carbonate, cured cement, Portland cement, calcium silicate or sodium silicate.

30. The cellular high-temperature insulation composite molded product of claim 23, wherein the respective proportions by weight of the expanded perlite, the calcium aluminate cement, the refractory clay and the wollastonite in said dry blend range from about 70 : 35 : 5 : 5 to about 130 : 70 : 25 : 40.

31. The cellular high-temperature insulation composite molded product of claim 23, wherein the respective proportions by weight for the water, the auxiliary binder, and the chemical cement curing accelerator range from about 80 : 10 : 0.1 to about 200 : 20 : 1.

32. The cellular high-temperature insulation composite molded product of claim 23, wherein the respective proportions by weight of said dry blend to said aqueous liquid composition range from about 1 : 3 to 1 : 0.5.

33. The cellular high-temperature insulation composite molded product of claim 23, wherein the composite molded product has a density of about 10 to 15 lb/ft$^3$, a compressive strength according to ASTM C-165 of about 45 to 100 psi and a modulus of rupture according to ASTM C-203 of about 30 to 90 psi.

34. The cellular high-temperature insulation composite molded product of claim 11, wherein said aqueous liquid composition further includes a chemical cement curing accelerator.

35. The cellular high-temperature insulation composite molded product of claim 34, wherein said expanded perlite has a particle size in accordance with the following

| U.S. Standard Sieve | Cumulative % (by weight) | |
|---|---|---|
| | Minimum | Maximum |
| + 50 | 0 | 10 |
| + 100 | 59 | 74 |
| + 200 | 90 | 100 |

36. The cellular high-temperature insulation composite molded product of claim 34, wherein said refractory clay is M & D clay, bentonite, kaolinite or montmorillonite.

37. The cellular high-temperature insulation composite molded product of claim 34, wherein said auxiliary binder is a synthetic resin.

38. The cellular high-temperature insulation composite molded product of claim 37, wherein said synthetic resin is a thermoplastic synthetic resin or a thermosetting synthetic resin.

39. The cellular high-temperature insulation composite molded product of claim 37, wherein said synthetic resin is an acrylic resin, a phenol-formaldehyde resin or a polyvinyl alcohol resin.

40. The cellular high-temperature insulation composite molded product of claim 34, wherein said reinforcing fibers are natural fibers, synthetic fibers or mixtures thereof.

41. The cellular high-temperature insulation composite molded product of claim 34, wherein said surface active agent is a nonionic surface active agent or an anionic surface active agent.

42. The cellular high-temperature insulation composite molded product of claim 34, wherein said chemical cement curing accelerator is lithium carbonate, cured cement, Portland cement, calcium silicate or sodium silicate.

43. The cellular high-temperature insulation composite molded product of claim 34, wherein the respective proportions by weight of the expanded perlite, the calcium aluminate cement, the refractory clay and the wollastonite in said dry blend range from about 70 : 35 : 5 : 5 to about 130 : 70 : 25 : 40.

44. The cellular high-temperature insulation composite molded product of claim 34, wherein the relative proportions by weight of the water, the auxiliary binder, the surface active agent, the reinforcing fibers, and the chemical cement curing accelerator range from about 80 : 10 : 0.1 : 1 : 0.1 to about 200 : 20 : 1 : 6 : 1.

45. The cellular high-temperature insulation composite molded product of claim 34, wherein the respective proportions by weight of said dry blend to said aqueous liquid composition range from about 1 : 3 to 1 : 0.5.

46. The cellular high-temperature insulation composite molded product of claim 34, wherein the composite molded product has a density of about 10 to 15 lb/ft$^3$, a compressive strength according to ASTM C-165 of about 45 to 100 psi and a modulus of rupture according to ASTM C-203 of about 30 to 90 psi.

47. A method of producing a cellular high-temperature insulation composite molded product which comprises
preparing a mixture of
  (1) a dry blend of
    (a) expanded perlite,
    (b) a calcium aluminate cement,
    (c) a refractory clay, and (d) wollastonite, with
(2) an aqueous liquid composition comprising
　(a) an auxiliary binder, and
　(b) water
molding said mixture, and
curing said molded mixture or allowing said molded mixture to cure.

48. A method of producing a cellular high-temperature insulation composite molded product which comprises
preparing a mixture of a dry blend of
　(a) expanded perlite,
　(b) a calcium aluminate cement,
　(c) a refractory clay, and
　(d) wollastonite,
adding said dry blend to a foamed aqueous liquid composition comprising
　(a) an auxiliary binder,
　(b) water,
　(c) reinforcing fibers, and
　(d) a surface active agent,
said foamed aqueous liquid composition being prepared by foaming a mixture of said water, said auxiliary binder and said surface active agent and adding said reinforcing fibers during said foaming,
molding said mixture, and
curing said molded mixture or allowing said molded mixture to cure.

* * * * *